June 5, 1928.
W. H. CADWELL ET AL
1,672,366
FLUSH VALVE
Filed July 3, 1925
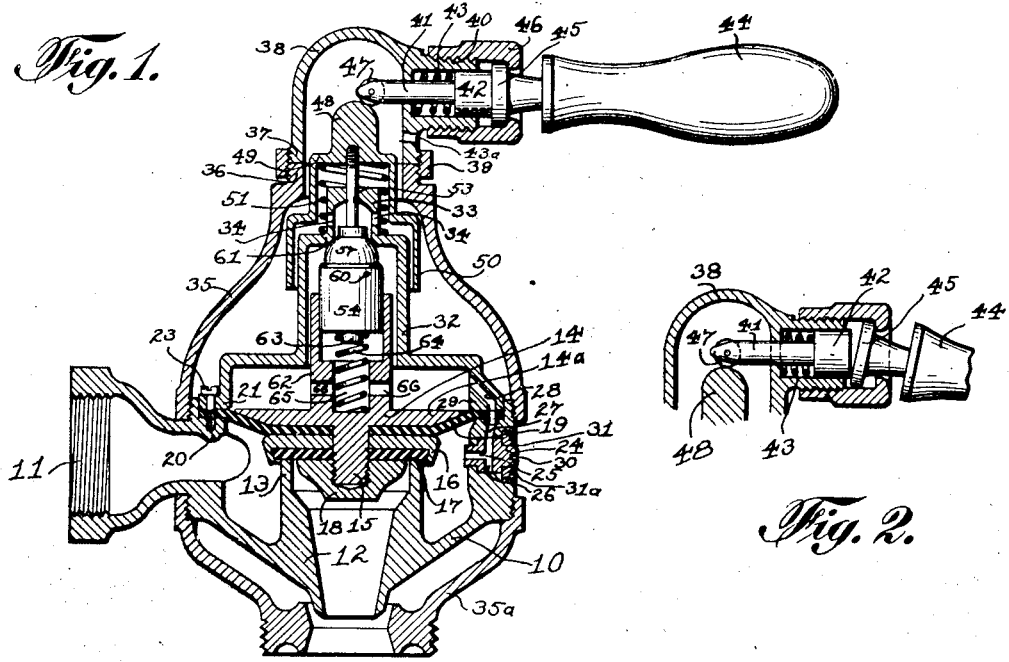
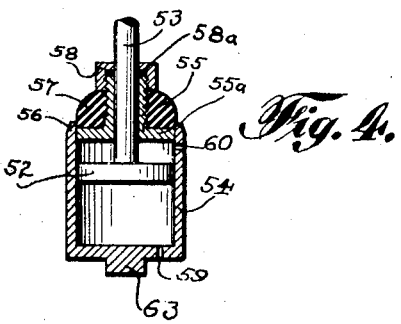
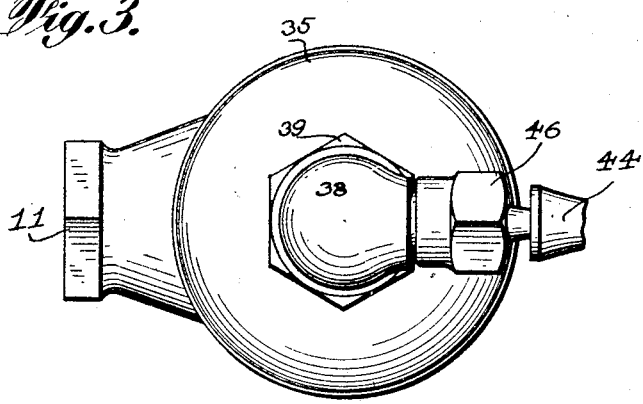
INVENTORS
William H. Cadwell,
John Ott,
Oscar C. Kavle.
BY H. G. Manning ATTORNEY Patented June 5, 1928.

1,672,366

UNITED STATES PATENT OFFICE.

WILLIAM H. CADWELL AND JOHN OTT, OF NEW BRITAIN, CONNECTICUT, AND OSCAR C. KAVLE, OF SYRACUSE, NEW YORK, ASSIGNORS TO THE BEATON & CADWELL MANUFACTURING COMPANY, OF NEW BRITAIN, CONNECTICUT, A CORPORATION OF CONNECTICUT.

FLUSH VALVE.

Application filed July 3, 1925. Serial No. 41,337.

This invention relates to improvements in flush valves, and more particularly to a flush valve having means for producing a single flush of a definite period irrespective of how long the operating handle is held down.

One object of this invention is to provide a flush valve of the double-chamber by-pass type in which the releasing valve is adapted to be instantly closed by the opening of the main valve.

A further object is to provide a flush valve of the above nature having an improved type of operating handle which is provided with a roller engagement with the head of the releasing valve.

A further object is to provide a device of the above nature which will be simple in construction, inexpensive to manufacture, easy to install and manipulate, compact, and very efficient and durable in use.

With these and other objects in view, there has been illustrated on the accompanying drawings, one form in which the invention may be conveniently embodied in practice.

Fig. 1 represents a side sectional view of the flush valve.

Fig. 2 is a sectional view, partly broken away, of a portion of the operating handle and releasing valve mechanism.

Fig. 3 is a top plan view of the flush valve.

Fig. 4 is a sectional view on an enlarged scale of the releasing valve, showing the cylinder and the piston fitting therein.

Referring now to the drawings in which like reference numerals denote corresponding parts throughout the several views, the numeral 10 indicates the body member of the flush valve, said body member having an inlet 11 in one side and an outlet 12 in its bottom. The top of the outlet 12 terminates in an annular ring 13 which forms a seat for a main valve 14.

The main valve 14 comprises a flat disc section 14ª, an upwardly extending tubular section 62, and a depending shaft 15. The shaft 15 is threaded on its lower end and has mounted thereon a circular flexible diaphragm 19, preferably of rubber, and an inverted cup-shaped disc 16, within the rim of which is seated a flexible washer 17 of rubber or other suitable material. The washer 17 is held in place by a tapered threaded nut 18 screwed over the end of the shaft 15 and being adapted to seat upon the annular ring 13 of the body member 10 and normally preventing the passage of water through the outlet 12.

The diaphragm 19 has its edge seated in an annular recess formed on the inside of a flange 20 of the body member 10, and said diaphragm is held rigidly in said flange 20 by the flange 21 of a cover member 22, said flanges 20 and 21 and said diaphragm 19 being held together by a plurality of screws 23.

The space in the flush valve within the body member 10 and the cover member 22 will hereinafter be termed the "casing", the part below the diaphragm 19 being designated as the "main chamber", while the part above the diaphragm will be designated as the "control chamber".

In order to provide means for restoring the pressure in the control chamber after the operation of the releasing valve, a by-pass is provided in the side of the casing opposite the inlet 11. The by-pass comprises a rotary plug 24 having a longitudinal passage 25 communicating with the main chamber, and a transverse passage 26 passing entirely through the plug and connecting with a passage 27 in the flange 20. The passage 27 in turn leads to an inclined passage 28 passing through an enlarged boss 29 of the cover member 22, and communicating with the interior of the "control chamber".

The rotary plug 24 may be adjusted to change the period of flow of the single flushing operation by twisting said plug with a screw driver which may be fitted in a slot 30.

In order to lock the rotary plug 24 in any desired adjusted position, it will merely be necessary to drive in a lock bushing 31 which surrounds said plug 24 and is screwed into a threaded recess in the body member 10. The lock bushing is provided with a pair of side holes 31ª for manipulation by a spanner wrench.

In order to provide bearings for a releasing valve to be hereinafter described, the cover member 22 is provided with a reduced cylindrical section 32 terminating at its upper end in a cylindrical section 33 of still further reduced diameter, the section 33 being provided with a pair of oppositely disposed apertures 34. The upper part of the flush valve is covered by an upper shell member 35, which is enlarged at its base and is adapted to be screwed upon the outside of the flange 20, as clearly shown in Fig. 1. A lower shell member 35ª covers the lower part of the flush valve.

The top of the upper shell 35 is provided with a reduced threaded shoulder 36 adapted to aline with the threaded base 37 of a cap member 38, said base 37 having threads of a pitch opposite to those of the shoulder 36. The shoulder 36 and base 37 are adapted to be tightly joined by a union 39. The cap member 38 has a laterally extending section 40 through which extends a rod 41 connected to a piston member 42. The piston member 42 is normally pressed outwardly by a spiral spring 43 but is adapted to be moved inwardly by bending a handle 44 in any direction. A vent 43ª is provided in the base of the upper shell 35. The bending of the handle 44 causes a flanged head member 45 on the inner end of said handle 44 to move said piston member 42 inwardly. The flanged head member 45 is adapted to be securely locked in position by a collar member 46, one end of which is bent inwardly to form a flange and the other end being screwed upon the laterally extending section 40 of said cap member 38.

In order to permit the releasing valve to be actuated with the minimum of friction, the end of the rod 41 is provided with a thin roller 47 adapted to engage a spherical head 48 on the top of a floating cap 49, said floating cap having an enlarged skirt member 50 which surrounds and is guided by the cylindrical section 32 of the cover member 22. A spiral spring 51 surrounds the reduced cylindrical section 33 and is adapted to press upwardly against the floating cap 49 at all times.

In order to cause a small quantity of water to be released from the control chamber when the handle 44 is actuated, provision is made of a releasing valve, now to be described. The releasing valve includes a piston 52 connected to the lower side of the spherical head 48 by a piston rod 53 which is screwed into said head. The piston 52 is adapted to slide within a cylinder 54, and the piston rod is journaled in a water tight threaded bearing section 55. Extending from the bearing section 55 is a flat flange 55ª tightly fitted within and closing the open end 56 of the cylinder 54. Seated on the flange 55ª is an annular convex valve ring 57 of flexible material such as rubber, said ring 57 being held in place by a locking cap 58 screwed upon the end of said bearing section 55. A suitable leak-preventing washer 58ª is located within said locking cap 58.

As is most clearly shown in Fig. 1, the convex releasing valve ring 57 is adapted to engage against an interior shoulder 61 formed at the bottom of the reduced cylindrical section 33 of the cover member 22. The cylinder 54 is adapted to have a limited sliding movement within the tubular extension 62 on the top of the main valve 14, and said cylinder is provided on its bottom with a central lug 63 adapted to form a seat for a spiral spring 64, the lower end of said spring being seated within a recess 65 on the top of said main valve 14. Suitable passages 66 are provided in the extension 62 to connect the recess 65 with the interior of the control chamber.

In order to permit slow leakage of water from the cylinder 54 below the piston 53, the base of the cylinder 54 is provided with a small bleed hole 59. An air hole 60 is provided in the side of the cylinder 54 near its top so as to prevent the formation of an air pocket which might obstruct the free movement of the piston within the cylinder.

In operation, when it is desired to operate the flush valve, the user will grasp the handle 44 and bend it through an angle sufficient to force the piston 42 from the position shown in Fig. 1 to the position shown in Fig. 2. This action will cause the roller 47 to force down the spherical head 48 and the piston 53 connected therewith.

In view of the fact that the space in the cylinder 54 below the piston is filled with water, which has had not time to escape, the cylinder 54 will also be forced down, causing the valve ring 55 to leave its seat on the shoulder 61. This action will permit the escape of a small quantity of water from the control chamber and out through the apertures 34 in the reduced section 33 of the cover member 22, thus reducing the pressure in said control chamber. The greater pressure in the main chamber will then overcome the lower pressure in the control chamber and will raise the main valve 14 from its seat permitting the flushing stream to flow through the main chamber and outlet 12.

When the main valve moves upwardly, the base of the cylinder 54 will be engaged by the main valve and said cylinder will be quickly forced upwardly to close the releasing valve, even though the operator may still be pressing on the operating handle 44. When the handle 44 is released, the piston 53 will be pushed upwardly to its original position under the influence of the spring 51 and the pressure of the water in the control chamber. Water, however, will continue to flow through the flush valve until the leakage through the by-pass has again equalized the pressures in the main and control chambers.

One advantage of this invention is that the time of flush will be unaffected by the length of time that the operator holds down the operating handle. In other words, a single flush of the same fixed period will be produced not only from a slight tapping of the handle, but also when the handle is held down for several seconds.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a flush valve, a casing, a diaphragm dividing said casing into a main chamber and a control chamber, a main valve supported on said diaphragm for controlling the flow of a flushing stream, a valve for reducing the pressure in said control chamber to cause said main valve to open, said pressure-reducing valve comprising a fluid-containing cylinder, said casing having an opening provided with a seat for the outside of said cylinder, a piston located within said cylinder, and means outside of said casing for moving said piston for causing said pressure-reducing valve to open.

2. In a flush valve, a casing, a diaphragm dividing said casing into a main chamber and a control chamber, a main valve supported on said diaphragm for controlling the flow of a flushing stream, a valve for reducing the pressure in said control chamber to cause said main valve to open, said pressure-reducing valve comprising a fluid-containing cylinder slidably mounted in said main valve, said casing having an opening provided with a seat for said pressure-reducing valve, a piston located within said cylinder, and means outside of said casing for moving said piston to cause said pressure-reducing valve to open.

3. In a flush valve, a casing, a diaphragm dividing said casing into a main chamber and a control chamber, a main valve supported on said diaphragm for controlling the flow of a flushing stream, a valve for reducing the pressure in said control chamber to cause said main valve to open, said pressure-reducing valve comprising a fluid-containing cylinder slidably and resiliently mounted in said main valve, said casing having an opening provided with a seat for said pressure-reducing valve, a piston located within said cylinder, and means outside of said casing for moving said piston, to cause said pressure-reducing valve to open.

4. In a flush valve, a casing having a main chamber and a control chamber, means actuated by the reduction of pressure in said control chamber for causing a flushing stream of water to flow through said main chamber, means to reduce the pressure in said control chamber comprising a releasing valve seated in an opening in said control chamber, said releasing valve including a cylinder, a piston in said cylinder, said cylinder having a bleed hole below said piston for permitting water from said control chamber to pass into said cylinder, means outside said casing for moving said piston and thereby opening said releasing valve, said releasing valve being closed quickly by the opening of said main valve irrespective of how long the pressure in said control chamber remains reduced, and means for restoring the pressure in said control chamber.

In testimony whereof, I have affixed my signature to this specification.

OSCAR C. KAVLE.

In testimony whereof, we have affixed our signatures to this specification.

WILLIAM H. CADWELL.
JOHN OTT.